Dec. 8, 1925.
C. N. CORYELL
LIP STICK HOLDER
Filed Aug. 8, 1923
1,565,142
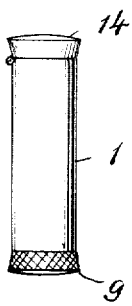
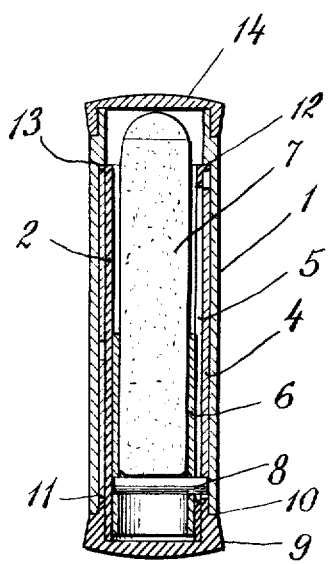
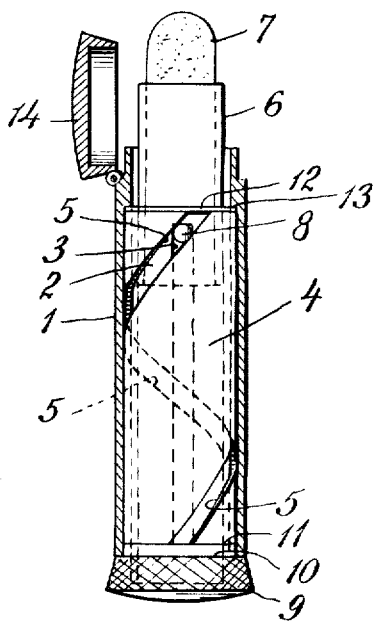
INVENTOR
Charles N. Coryell
BY
Pennie Davis Marvin & Edmonds
his ATTORNEYS Patented Dec. 8, 1925.

1,565,142

UNITED STATES PATENT OFFICE.

CHARLES NEWTON CORYELL, OF MAMARONECK, NEW YORK.

LIP-STICK HOLDER.

Application filed August 8, 1923. Serial No. 656,393.

*To all whom it may concern:*

Be it known that I, CHARLES N. CORYELL, a citizen of the United States, residing at Mamaroneck, in the county of Westchester, State of New York, have invented certain new and useful Improvements in Lip-Stick Holders; and I do hereby declare the following to be a full, clear, and exact description of the invention, such as will enable others skilled in the art to which it appertains to make and use the same.

This application relates to lip stick holders, and in particular to improved means for advancing the stick beyond the end of the holder for use and withdrawing it into the holder afterwards.

Lip stick holders have been provided with means for advancing the stick for use and retracting it. As commonly constructed, the end of the stick itself is held within a relatively short container which in turn slides in the holder proper. This holder is provided with a longitudinal slot through which a pin on the container protrudes and the stick is moved longitudinally of the holder by thumb pressure against the pin. Such devices are relatively crude and do not appeal to the taste of the discriminating user. It is broadly the object of the present invention to improve lip stick holders of this type. This I have done by employing a helical advancing mechanism, whereby rotation of the stick effects a simultaneous longitudinal movement, and the stick advanced or retracted accordingly. This mechanism is entirely incased within the holder and is operated by merely turning a head on the lower end of the holder. The operation is very simple and the holder itself of greatly improved appearance. In designing this novel holder, I have made many improvements in the details of construction, which will be pointed out in the description which follows and in the claims.

In order that the invention may be more clearly understood, I have illustrated a preferred embodiment of it in the accompanying drawings, in which Fig. 1 is a side elevation of my improved lip stick holder; Fig. 2 is a longitudinal section on an enlarged scale, showing a new and unused lip stick in position in the holder; and Fig. 3 is a view partly in section illustrating the advancing and retracting mechanism, and showing the lip stick in the most advanced position.

The holder illustrated in these drawings is provided with an outer cylindrical casing 1, in which the lip stick and its advancing mechanism are housed. Within this outer cylinder is mounted an inner cylinder 2 provided with a longitudinal slot 3 extending substantially the entire length of the cylinder. Intermediate of the cylinders 1 and 2 is placed a tube 4 provided with a helical slot 5. This slotted tube may be made by cutting a slot of the necessary pitch in ordinary brass tubing. The tube is of such a diameter relative to the inner and outer cylinders, that when the parts are assembled it makes frictional contact with the inner walls of the outer cylinder and remains fixed relative thereto. The inner cylinder, however, is of somewhat lesser diameter than the tube and may be readily rotated therein.

A short cylindrical tube section 6 lies within the inner cylinder and serves as a container for the lower end of the lip stick 7. This container is provided with a pin 8, which passes across the tube near one end thereof, and extends on one side into both the longitudinal slot 3 and the helical slot 5. The primary function of this pin is to impart movement to the container 6. It performs a secondary function, however, as a stop limiting the position of the lip stick when the holder is being loaded.

The lower end of the inner cylinder is provided with a flared, preferably knurled head 9, which, when the holder is assembled, forms an extension of the outer cylinder, the lower end of this cylinder abutting against an annular shoulder 10 on the head. The upper peripheral edge 11 of the head in conjunction with the inner cylinder forms a second and inner shoulder, which cooperates with a flange 12 on the upper end of the inner cylinder to prevent longitudinal displacement of the helically slotted tube 4. The outer cylinder is also provided with an internal annular shoulder 13 near its upper end, against which the flange 12 abuts. The parts are so proportioned that this shoulder 12 takes the thrust from the head 9 during operation, and prevents any binding at the lower end where the end of the outer cylinder abuts against the shoulder 10. A cap 14 of the same general shape as the head 9 is hinged at the upper end of the cylinder 1 and completes the device.

The manner of using the holder, just described, may be briefly reviewed as follows: When a new stick has been placed in the holder and the holder closed, the parts are in the position illustrated in Fig. 2. To use this stick, the cover is swung back and the head 9 given a slight turn relative to the cylinder 1. As the tube 4 is fixed relative to the cylinder 1, this turning of the head 9 causes the pin 8 to slide upwardly in the helical slot 5, and thus advance the container 6 and the lip stick. After use, the head 9 is turned in the opposite direction and the lip stick retracted. As the stick is used up, the container 6 must be advanced farther and farther toward the upper end of the tube. By means of such an advancing mechanism, it is clear that practically the entire stick can be used up, the length of the stick projecting beyond the end of the holder being held constant at all times.

I claim:

1. In a holder of the character disclosed, concentrically disposed relatively rotatable tubular members, one having a longitudinal slot and the other a helical slot, an open-ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the outer member, the opposite end of the inner member being open and having an outwardly turned flange rotatably engaging over the adjoining end of the outer slotted member, whereby said outer slotted member is rotatably confined between the shoulders provided by the head and out-turned flange at the opposite ends of the inner member, a casing fixedly engaged over the outer slotted member and a cover for the open end of the holder, said cover engaging over the end of the casing and said casing having an internal shoulder engaging over the out-turned flange on the end of the inner slotted tubular member.

2. In a holder of the character disclosed, concentrically disposed relatively rotatable tubular members, one having a longitudinal slot and the other a helical slot, an open ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the other member, the opposite end of the inner member being open and having an outwardly turned flange rotatably engaging over the adjoining end of the outer slotted member, whereby said outer slotted member is rotatably confined between the shoulders provided by the head and out-turned flange at the opposite ends of the inner member, a casing fixedly engaged over the outer slotted member, a cover for the open end of the holder and a second shoulder on the operating head outside the first shoulder and providing an abutment for the end of the casing.

In testimony whereof I affix my signature.

CHARLES NEWTON CORYELL.

holder and the holder closed, the parts are in the position illustrated in Fig. 2. To use this stick, the cover is swung back and the head 9 given a slight turn relative to the cylinder 1. As the tube 4 is fixed relative to the cylinder 1, this turning of the head 9 causes the pin 8 to slide upwardly in the helical slot 5, and thus advance the container 6 and the lip stick. After use, the head 9 is turned in the opposite direction and the lip stick retracted. As the stick is used up, the container 6 must be advanced farther and farther toward the upper end of the tube. By means of such an advancing mechanism, it is clear that practically the entire stick can be used up, the length of the stick projecting beyond the end of the holder being held constant at all times.

I claim:

1. In a holder of the character disclosed, concentrically disposed relatively rotatable tubular members, one having a longitudinal slot and the other a helical slot, an open-ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the outer member, the opposite end of the inner member being open and having an outwardly turned flange rotatably engaging over the adjoining end of the outer slotted member, whereby said outer slotted member is rotatably confined between the shoulders provided by the head and out-turned flange at the opposite ends of the inner member, a casing fixedly engaged over the outer slotted member and a cover for the open end of the holder, said cover engaging over the end of the casing and said casing having an internal shoulder engaging over the out-turned flange on the end of the inner slotted tubular member.

2. In a holder of the character disclosed, concentrically disposed relatively rotatable tubular members, one having a longitudinal slot and the other a helical slot, an open ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the other member, the opposite end of the inner member being open and having an outwardly turned flange rotatably engaging over the adjoining end of the outer slotted member, whereby said outer slotted member is rotatably confined between the shoulders provided by the head and out-turned flange at the opposite ends of the inner member, a casing fixedly engaged over the outer slotted member, a cover for the open end of the holder and a second shoulder on the operating head outside the first shoulder and providing an abutment for the end of the casing.

In testimony whereof I affix my signature.

CHARLES NEWTON CORYELL.

DISCLAIMER 1,565,142.—*Charles Newton Coryell*, Mamaroneck, N. Y. LIP-STICK HOLDER. Patent dated December 8, 1925. Disclaimer filed January 23, 1935, by the assignee, *Scovill Manufacturing Company*.

Hereby enters this disclaimer to that part of the claim in said specification which is in the following words, to wit:

"2. In a holder of the character disclosed, concentrically disposed relatively rotatable tubular members, one having a longitudinal slot and the other a helical slot, an open ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the other member, the opposite end of the inner member being open and having an outwardly turned flange rotatably engaging over the adjoining end of the outer slotted member, whereby said outer slotted member is rotatably confined between the shoulders provided by the head and outturned flange at the opposite ends of the inner member, a casing fixedly engaged over the outer slotted member, a cover for the open end of the holder and a second shoulder on the operating head outside the first shoulder and providing an abutment for the end of the casing."

[*Official Gazette February 26, 1935.*]

DISCLAIMER 1,565,142.—*Charles Newton Coryell*, Mamaroneck, N. Y. LIP-STICK HOLDER. Patent dated December 8, 1925. Disclaimer filed January 23, 1935, by the assignee, *Scovill Manufacturing Company*.

Hereby enters this disclaimer to that part of the claim in said specification which is in the following words, to wit:

"2. In a holder of the character disclosed, concentrically disposed relatively rotatable tubular members, one having a longitudinal slot and the other a helical slot, an open ended carrier guided in the inner tubular member and having a pin transverse of the carrier and extending beyond the side thereof at the bottom of the carrier providing a stop for an article in the carrier, said extended portion operating in the longitudinal and helical slots in the two members, the inner member being closed at one end by an operating head provided with a shoulder rotatably engaged by the adjoining end of the other member, the opposite end of the inner member being open and having an outwardly turned flange rotatably engaging over the adjoining end of the outer slotted member, whereby said outer slotted member is rotatably confined between the shoulders provided by the head and outturned flange at the opposite ends of the inner member, a casing fixedly engaged over the outer slotted member, a cover for the open end of the holder and a second shoulder on the operating head outside the first shoulder and providing an abutment for the end of the casing."

[*Official Gazette February 26, 1935.*]